United States Patent
Wang

(10) Patent No.: US 7,773,936 B2
(45) Date of Patent: Aug. 10, 2010

(54) METHOD, DEVICE AND SYSTEM FOR IMPLEMENTING DIRECTIONAL BROADCAST IN MOBILE DATA BROADCASTING

(75) Inventor: Shengqiong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 517 days.

(21) Appl. No.: 11/691,905

(22) Filed: Mar. 27, 2007

(65) Prior Publication Data

US 2007/0200728 A1  Aug. 30, 2007

Related U.S. Application Data

(63) Continuation of application No. PCT/CN2006/000268, filed on Feb. 24, 2006.

(30) Foreign Application Priority Data

Feb. 25, 2005  (CN) .................. 2005 1 0051040

(51) Int. Cl.
*H04H 20/71* (2008.01)
*H04H 40/00* (2008.01)
*H04B 7/00* (2006.01)

(52) U.S. Cl. ................. 455/3.01; 455/3.06; 455/456.1; 455/66.1

(58) Field of Classification Search ............... 455/3.01, 455/3.05, 3.06, 185, 3.04, 66.1
See application file for complete search history.

(56) References Cited

U.S. PATENT DOCUMENTS

| | | | |
|---|---|---|---|
| 6,112,063 A * | 8/2000 | Ravi et al. ............... 455/186.1 |
| 6,351,647 B1 * | 2/2002 | Gustafsson .................. 455/466 |
| 6,697,631 B1 * | 2/2004 | Okamoto ..................... 455/457 |
| 7,135,967 B2 * | 11/2006 | Culpepper et al. ..... 340/539.21 |
| 7,415,243 B2 * | 8/2008 | Yuhara et al. ............... 455/12.1 |
| 2003/0181160 A1 * | 9/2003 | Hirsch ........................ 455/3.02 |

(Continued)

FOREIGN PATENT DOCUMENTS

CN  1206538 A  1/1999

(Continued)

OTHER PUBLICATIONS

State Intellectual Property Office of the People's Republic of China, Written Opinion of the International Searching Authority in International Patent Application No. PCT/CN2006/000268 (Jun. 1, 2006).

*Primary Examiner*—Tilahun Gesesse
(74) *Attorney, Agent, or Firm*—Leydig, Voit & Mayer, Ltd.

(57) ABSTRACT

Embodiments of the present invention disclose a method, a device and a system for implementing directional broadcast in mobile data broadcasting. In the method, upon receiving a broadcast message from a content server, a network element processes the broadcast message according to first location information carried in the broadcast message and second location information in the network element. In the embodiments of the present invention, with the first location information carried in the broadcast message and the second location information set in the network element, upon receiving the broadcast message, the network element processes the broadcast message according to the first location information and the second location information, so that the content server may implement directional broadcast for a special location area without directly accessing a directional location area, which reduces the network complexity.

13 Claims, 4 Drawing Sheets

U.S. PATENT DOCUMENTS

2004/0192189 A1* 9/2004 Yuhara et al. .............. 455/3.02
2004/0198217 A1* 10/2004 Lee et al. ................... 455/3.01
2006/0034313 A1 2/2006 Aaltonen

FOREIGN PATENT DOCUMENTS

| CN | 1540935 A | 10/2004 |
|---|---|---|
| EP | 1435600 A1 | 7/2004 |
| KR | 2002-0046769 A | 6/2002 |
| WO | WO 98/36603 A2 | 8/1998 |
| WO | WO 01/11382 A1 | 2/2001 |
| WO | WO 2004/036827 A1 | 4/2004 |

* cited by examiner

METHOD, DEVICE AND SYSTEM FOR IMPLEMENTING DIRECTIONAL BROADCAST IN MOBILE DATA BROADCASTING

This application is a continuation of International Patent Application No. PCT/CN2006/000268, filed Feb. 24, 2006, which claims priority to Chinese Patent Application No. 200510051040.X, filed Feb. 25, 2005, all of which are hereby incorporated by reference.

FIELD OF THE INVENTION

The present invention relates to the field of mobile data broadcasting, and particularly to a method, a device and a system for implementing directional broadcast in mobile data broadcasting.

BACKGROUND OF THE INVENTION

Mobile Broadcast Service (BCAST) is a kind of mobile broadband digital broadcast/multicast service. A prominent application demand of the BCAST is directional broadcast, and the directional broadcast means to broadcast for mobile users within a given location area through a mobile broadcast network, e.g. broadcast advertisement information of an shopping mall within a commercial district for users who enter the commercial district.

In the related art, in order to broadcast for the mobile users within the given location area as described above, as shown in FIG. 1 that illustrates the network composition, a content server needs to access the broadcast network corresponding to the given location area and broadcasts a broadcast message in the whole broadcast network, which makes it possible to send the broadcast message to a client within the given location area. A relation between the broadcast network and the location area is designed in advance. The broadcast network may include one base station, or several base stations, or even more base stations, and the location area corresponding to the broadcast network may cover a range covered by one base station, a range covered by several base stations or a range covered by even more base stations.

As shown in FIG. 1, content server 11a connects to broadcast networks 12a, 12b and 12c, thus content server 11a is able to directionally broadcast for location areas corresponding to the three broadcast networks above; and content server 11b connects to broadcast networks 12b and 12c, thus content server 11b is able to directionally broadcast for the location areas corresponding to the two broadcast networks 12b and 12c. FIG. 1 illustrates only the case of two content servers and three broadcast networks. In case of more content servers and more broadcast networks, a content server needs to directly connect to each of the broadcast networks which are the objects of directional broadcast.

When conducting the directional broadcast in accordance with the related art, a content server providing broadcast contents has to directly connect to the broadcast network corresponding to the location area where the directional broadcast is to be given, and one content server needs to access multiple broadcast networks when providing the broadcast contents for the multiple broadcast networks. As one-to-one connections must be created between the content servers and the broadcast networks, the network becomes much more complex, the workload of network administration for operators increases greatly, and the network security reduces.

Besides, the location area where directional broadcast is to be given must be a location area corresponding to a broadcast network designed in advance. The broadcast network may cover the range of one or several base stations, or a larger range. Thus, it may be impossible to implement a service that should be accurately directed to a smaller location area in the broadcast network.

SUMMARY OF THE INVENTION

An embodiment of the present invention provides a method for implementing directional broadcast in mobile data broadcasting, which reduces the network complexity.

A method for implementing directional broadcast in mobile data broadcasting includes:

upon receiving a broadcast message sent by a content server, processing, by a network element, the broadcast message according to first location information carried in the broadcast message and second location information in the network element.

The second location information includes location information of the network element; and the process of processing the broadcast message according to the first location information and the second location information includes:

determining, by the network element, whether the first location information matches the location information of the network element;

if the first location information matches the location information of the network element, sending the broadcast message; otherwise, discarding the broadcast message.

The network element sends the broadcast message through broadcasting; or sends the broadcast message to a subordinate network element or to a next network element.

Preferably, the process of processing the broadcast message according to the first location information and the second location information includes, determining whether the first location information matches the second location information;

if the first location information matches the second location information, showing or playing the broadcast message; otherwise, discarding the broadcast message.

Preferably, the second location information includes the location information of the network element and location information of other network elements related to the network element; and the process of processing the broadcast message according to the first location information and the second location information includes:

determining, by the network element, whether the first location information matches the location information of the network element;

if the first location information matches the location information of the network element, sending the broadcast message according to matched location information;

otherwise, finding one or more network elements, the location of the one or more network elements being proximal to the location indicated in the first location information according to the location information of said other network elements related to the network element, and sending the broadcast message to the one or more network elements.

Preferably, the method further includes:

before determining whether the first location information matches the location information of the network element, determining, by the network element, whether the location indicated in the first location information is contrary to the location indicated in the location information of the network element;

if the location indicated in the first location information is contrary to the location indicated in the location information of the network element, discarding the broadcast message.

Preferably, the method further includes:

before finding the one or more network elements, determining, by the network element, whether the location indicated in the first location information is contrary to the location indicated in the location information of the network element;

if the location indicated in the first location information is contrary to the location indicated in the location information of the network element, discarding the broadcast message.

Preferably, the process of sending the broadcast message according to the matched location information includes:

determining, by the network element, whether the first location information completely matches the location information of the network element;

if the first location information completely matches the location information of the network element, sending the broadcast message to all subordinate network elements or all next network elements among said other network elements related to the network element;

otherwise, determining, by the network element, whether the first location information partially matches the location information of the network element;

if the first location information partially matches the location information of the network element, sending the broadcast message to a subordinate network element or a next network element among said other network elements related to the network element according to both a matched part and the location information of said other network elements related to the network element.

Preferably, the process of sending the broadcast message to the subordinate network element or the next network element according to both the matched part and the location information of said other network elements related to the network element includes:

searching the location information of said other network elements related to the network element to find the location information matching the matched part, and sending the broadcast message to the subordinate network element or the next network element corresponding to the location information matching the matched part.

The method further includes:

upon sending the broadcast message to the subordinate network element or the next network element according to both the matched part and the location information of said other network elements related to the network element, searching the location information of said other network elements related to the network element to find location information of one or more network elements; wherein the location indicated in the location information of one or more network elements is proximal to the location indicated in an unmatched part, and sending the broadcast message to the one or more network elements corresponding to the location information found.

Preferably, the location information includes latitude and longitude information or geographical name information.

Another embodiment of this disclosure provides a network element.

The network element includes:

a first module, for processing a broadcast message received according to first location information carried in the broadcast message and second location information;

a second module, for storing the second location information.

Preferably, the first module includes:

a third module, for determining whether the first location information matches the second location information which is location information of the network element; and a fourth module, for sending the broadcast message or discarding the broadcast message when receiving a determination result from the third module.

Preferably, the first module includes:

a third module, for determining whether the first location information matches location information of the network element included in the second location information; and a fifth module, for sending the broadcast message according to matched location information and finding one or more network elements of which location is proximal to the location indicated in the first location information according to location information of other network elements related to the network element when receiving a determination result from the third module, and sending the broadcast message to the one or more network elements.

The network element has a control area or is an intermediate transferring network element.

Another embodiment of this disclosure provides a broadcast system.

The broadcast system includes:

a content server, for sending a broadcast message containing first location information;

a network element, for processing the broadcast message according to the first location information and second location information stored in the network element.

It can be seen from the technical solution above that, with the first location information carried in the broadcast message and the second location information preset in the network element, upon receiving the broadcast message, the network element processes the broadcast message according to the first location information and the second location information, and the content server may conduct the directional broadcast for the given location area without directly accessing the given location area, thus reducing the network complexity.

In this disclosure, upon receiving the broadcast message, the terminal device processes the broadcast message according to the first location information and the second location information, and the directional broadcast may be directed to a location area where one or several terminal devices are located, which greatly increases the precision of directional broadcast.

In this disclosure, as the location information of other network elements connected to the network element is set in the network element, if the first location information matches the location information of other network elements set in the network element, the broadcast message will be sent to matched network elements of the other network elements, which decreases the traffic of network information and shorten the path for the broadcast message.

In this disclosure, upon determining that the location indicated in the first location information is contrary to the location indicated in the second location information, the network element discards the broadcast message instead of sending the broadcast message, further decreasing the traffic of network information.

DETAILED DESCRIPTION OF THE INVENTION

Figure 1:
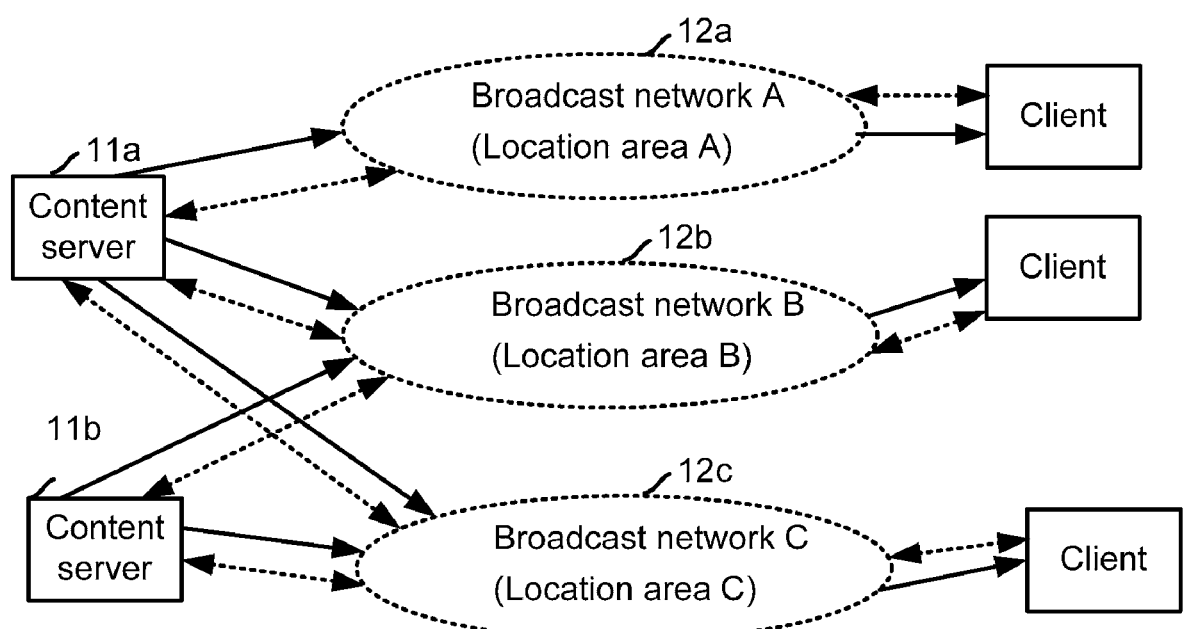
FIG. 1 is a diagram illustrating the network composition in a directional service according to the related art.

Embodiments of the disclosure are hereinafter described in detail with reference to accompanying drawings so as to make the technical scheme and merits thereof more apparent.

In an embodiment of the disclosure, the method for implementing directional broadcast in mobile data broadcasting includes: setting location information in a network element; carrying location information in a broadcast message sent by a content server; after the content server sends the broadcast message, processing, by the network element receiving the broadcast message, the broadcast message according to the location information carried in the broadcast message and the location information set.

The network element above includes a terminal device, a network element capable of directly transmitting, e.g. a base station, a network element having a control area, e.g. a Radio Network Controller (RNC) and a Mobile Switch Center (MSC), and an intermediate transferring network element, e.g. a routing device.

The location information above may include latitude and longitude information, geographical name information, or other information capable of identifying a location. When the location information includes the latitude and longitude information, an exact value of latitude and longitude of the location where the network element is located or a range of latitude and longitude managed by the network element may be set in the network element. For example, the location information may be east longitude 116 degrees and 4 minutes, north latitude 39 degrees and 3 minutes, or east longitude 116 degrees and 4 minutes to 116 degrees and 5 minutes, north latitude 39 degrees and 5 minutes. When the location information includes the geographical name information, the information such as Xidan and Wangfujing may be set in the network element, or more specific location information such as Xidan shopping mall and Book Building may be set.

Embodiments of this disclosure are hereinafter described in detail.

In a first embodiment of this disclosure, preset location information in a network element capable of directly transmitting, when sending a broadcast message, a content server carries the location information of an area to be directed in the broadcast message.

After the content server sends the broadcast message, a network element incapable of directly transmitting broadcasts the broadcast message in a common broadcasting manner after it receives the broadcast message.

Upon receiving the broadcast message, the network element capable of directly transmitting obtains the location information carried in the broadcast message, and determines whether the location information carried in the broadcast message matches the location information of the network element capable of directly transmitting. If yes, the broadcast message is broadcast. If the location information carried in the broadcast message does not match the location information of the network element capable of directly transmitting, the broadcast message is discarded.

A second embodiment of this disclosure, based on the first embodiment, further includes setting location information in a network element having a control area, such as a Radio Network Controller (RNC) and a mobile switching device.

Upon receiving the broadcast message, the network element having a control area obtains the location information carried in the broadcast message, and determines whether the location information carried in the broadcast message matches the location information of the network element having a control area, if yes, sends, according to the location information matched, the broadcast message to a subordinate network element of the network element having a control area. If the location information carried in the broadcast message does not match the location information of the network element having a control area, the network element having a control area discards the broadcast message.

As the location information has been set in the network element having a control area, when the location information carried in the broadcast message matches none of the location information preset in the network element having a control area, the network element having a control area discards the broadcast message, thus reducing useless transmission of the broadcast message as well as network traffic.

With the development of terminal technology, many existing terminal devices have been capable of acquiring the location information, e.g., acquiring the current location information or geographic location information using a Global Positioning System (GPS). Thus, in a third embodiment of this disclosure, a terminal device may serve as a network element of directional broadcast, which is described below.

In the third embodiment of this disclosure, upon receiving the broadcast message, the terminal device obtains the location information carried in the broadcast message, and determines whether the location information carried in the broadcast message matches the location information of the terminal device, if yes, reserves the broadcast message and displays or shows contents of the broadcast message to the user; otherwise, discards the broadcast message before processing. Since the location information in the terminal device must be precise location information rather than a range of latitude and longitude, the matching means that the location information of the terminal device is the same as that carried in the broadcast message or that the location information of the terminal device is in the range of the location information carried in the broadcast message.

Upon receiving the broadcast message, other network elements apart from the terminal devices may process the broadcast message according to the location information carried therein in the same way as that described in the first two embodiments above, or just broadcast the broadcast message received.

In the third embodiment of this disclosure, as the terminal device is also used as a network element with location information, the broadcast message could be directed to an extremely small location area where several or even one terminal device is located, which greatly increases the directional precision of directional broadcast.

In a fourth embodiment of this disclosure, preset, in the network element having a control area, the location information of its own control area and location information of other network elements connected with the network element having a control area. In this embodiment, when sending the broadcast message, location information should be carried in the broadcast message.

In a network, after a content server sends the broadcast message, a network element processes the broadcast message according to the location information carried in the broadcast message and the location information of the network element upon receiving the broadcast message, and processing methods thereof are different with respect to different types of network elements, which are respectively described hereinafter in detail.

For the network element capable of directly transmitting, the method for processing the broadcast message in this embodiment is the same as that in the first embodiment. For a terminal device, the method for processing the broadcast message in this embodiment is the same as that in the third embodiment.

Figure 2:
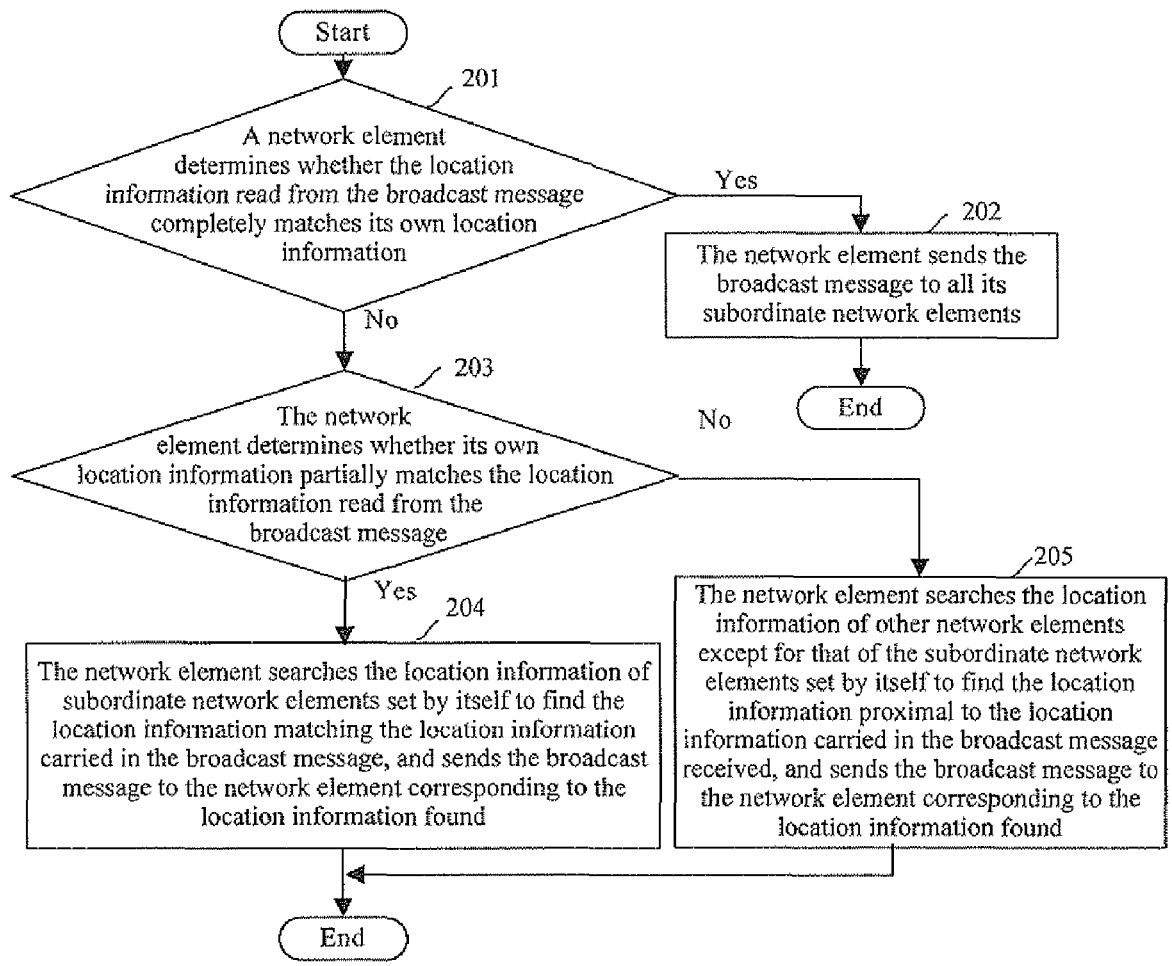
FIG. 2 is a flowchart for processing a broadcast message by a network element having a control area upon receiving the broadcast message in accordance with a fourth embodiment of this disclosure.

In addition, for the network element having a control area (called the network element for short in this embodiment), e.g., the RNC and the mobile switching device, upon receiving the broadcast message, the process for processing the broadcast message is shown in FIG. 2 and includes the following processes.

Step 201: upon receiving the broadcast message, the network element obtains the location information carried in the broadcast message, and determines whether the location information of the network element completely matches the location information obtained from the broadcast message; if yes, perform Step 202; otherwise, perform Step 203.

The completely matching means that the location information of the network element is completely identical with the location information obtained from the broadcast message or that the location information of the network element is in the range of the location information carried in the broadcast message. In such two cases, it may be determined that the broadcast message received by the network element needs to be sent in the entire location area managed by the network element, that is why it is called completely matching.

Step 202: the network element sends the broadcast message to all its subordinate network elements, and the process is terminated.

The subordinate network elements refer to other network elements managed by the network element, e.g., for the RNC, the subordinate network elements are all base stations managed by the RNC; for the mobile switching device, they are all RNCs managed by the mobile switching device.

Step 203: the network element determines whether the location information of the network element partially matches the location information obtained from the broadcast message; if yes, perform Step 204; otherwise, perform Step 205.

The partially matching in this process means that the location information carried in the broadcast message is in the range of the location information of the network element, or that the location information carried in the broadcast message and the location information of the network element include both the same range of location information and different ranges of location information.

Step 204: the network element searches the location information of the subordinate network elements set in the network element to find the location information matching the location information carried in the broadcast message, sends the broadcast message to a network element corresponding to the location information found, and the process is terminated.

For such network elements as the RNC and the mobile switching device, the location information of all their subordinate network elements will be preset in the network element. Since the location information of the network element partially matches the location information carried in the broadcast message, there must be location information of some subordinate network elements thereof matching the location information carried in the broadcast message completely or partially. After the network element sends the broadcast message to such subordinate network elements in this process, such subordinate network elements determine the location information carried in the broadcast message according to its own condition, and broadcast the broadcast message directly or continue to send the broadcast message downwards.

Step 205: the network element searches the location information of the other network elements except for that of the subordinate network elements set in the network element to find the location information in which the location indicated is proximal to the location indicated in the location information carried in the broadcast message received, and sends the broadcast message to a network element corresponding to the location information found.

In this embodiment, for the network element having a control area, after Step 204 is performed, and upon determining that the location information of the network element is part of the location information carried in the broadcast message in Step 201 and performing Step 202, the process will not be terminated, instead, the network element searches the location information of the other network elements except for that of the subordinate network elements set in the network element to find one or more than one item of location information in which the location indicated is proximal to the location indicated in the unmatched part of the location information carried in the broadcast message, and sends the broadcast message to the network element corresponding to the location information found.

A fifth embodiment of this disclosure, based on the fourth embodiment, further includes setting, in an intermediate transferring network element, the location information of the intermediate transferring network element and the location information of the next network elements connected with the intermediate transferring network element.

Figure 3:
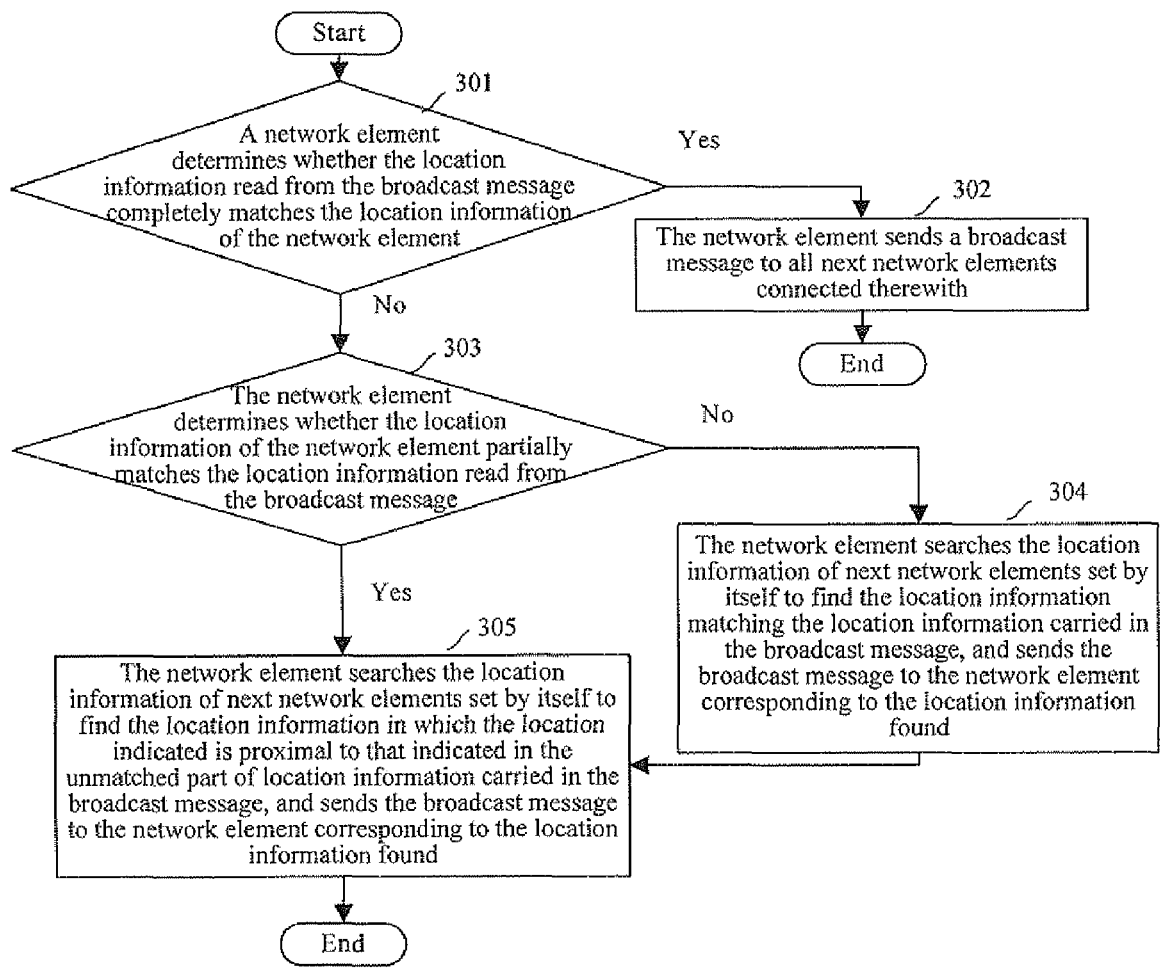
FIG. 3 is a flowchart for processing a broadcast message by an intermediate transferring network element upon receiving the broadcast message in accordance with a fifth embodiment of this disclosure.
Figure 4:
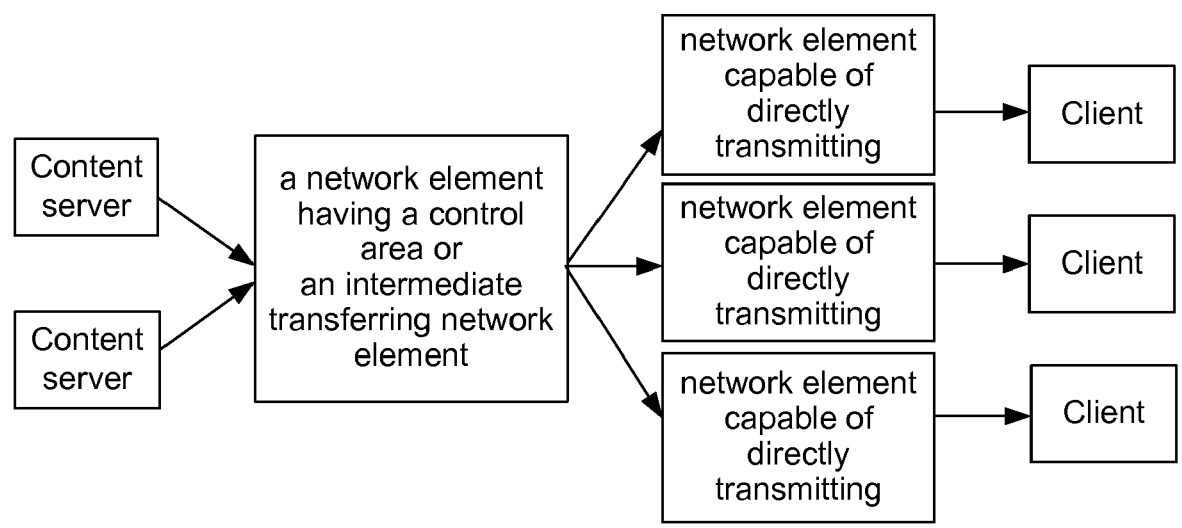
FIG. 4 is a flowchart showing basic structural directive broadcasting based on location information.

The intermediate transferring network element, such as a routing device, refers to other network elements incapable of directly transmitting and without a control area, except for the terminal device. After the location information is set, the process of processing a broadcast message by the intermediate transferring network element upon receiving the broadcast message is shown in FIG. 3. The process illustrated in FIG. 3 is substantially the same as that illustrated in FIG. 2 except for minor differences in Step 302, Step 304 and Step 305, which are given below respectively.

Step 302: the intermediate transferring network element sends the broadcast message to all the next network elements connected with the intermediate transferring network element.

Since the intermediate transferring network element is incapable of directly transmitting and has no control area, the intermediate transferring network element sends the broadcast message to all the next network elements connected with the intermediate transferring network element when the location information set in the intermediate transferring network element completely matches the location information carried in the broadcast message. The next network elements refer to all the network elements connected with the intermediate transferring network element apart from the network element sending the broadcast message to the intermediate transferring network element.

Step 304: the intermediate transferring network element searches the location information of the next network elements set in the intermediate transferring network element to find the location information matching the location information carried in the broadcast message, and sends the broadcast message to the network element corresponding to the location information found; then perform Step 305.

Step 305: the intermediate transferring network element searches the location information of the next network elements set in the intermediate transferring network element to find the location information in which the location indicated is proximal to the location indicated in the unmatched part between the location information carried in the broadcast message and the location information of the intermediate transferring network element, and sends the broadcast message to the network element corresponding to the location information found.

Since the location information carried in the broadcast message may contain a location range, the network element corresponding to the location information in which the location indicated is proximal to the location indicated in the location information carried in the broadcast message may be one or more.

In the fifth embodiment, although the intermediate transferring network element will send the broadcast message to the network element corresponding to the location information in which the location indicated is proximal to the location indicated in the location information carried in the broadcast message upon receiving the broadcast message, the broadcast message may be possibly sent in the contrary direction of the directional area to which the broadcast message should be sent. In order to reduce unnecessary network traffic caused by such a case, a sixth embodiment of this disclosure is given below.

The difference between the fifth embodiment and the sixth embodiment in accordance with this disclosure is that the network element having a control area or the intermediate transferring network element further determines, upon receiving the broadcast message, whether the location indicated in the location information carried in the broadcast message is contrary to the location indicated in the location information of the network element.

The determination may be made once the network element receives the broadcast message, i.e. makes the determination before Step 201 or 301. If contrary, discard the broadcast message; otherwise, perform Step 201 or 301.

Alternatively, upon determining that the location information carried in the broadcast message received is completely different from the location information of the network element, i.e., after the network element determines that no part of the location information carried in the broadcast message received matches the location information of the network element in the Step 203 or 303, the network element may determine whether the location indicated in the location information carried in the broadcast message is contrary to the location indicated in the location information of the network element; if contrary, discards the broadcast message; otherwise, perform the Step 205 or 305.

The method for determining whether the location indicated in the location information carried in the broadcast message is contrary to that indicated in the location information of the network element is hereinafter described by supposing that the location information includes latitude and longitude.

Supposing that destination latitude and longitude information carried in the broadcast message received by network element A is east longitude 116 degrees, 4 minutes and 20 seconds, north latitude 39 degrees, 3 minutes and 32 seconds, the latitude and longitude information of network element A is east longitude 116 degrees, 4 minutes and 28 seconds, north latitude 39 degrees, 3 minutes and 42 seconds, and the longitudes in the longitude information of other network elements set in network element A are all higher than 116 degrees, 4 minutes and 28 seconds while the latitudes in the latitude information of other network elements set in network element A are all higher than 39 degrees, 3 minutes and 42 seconds, which are contrary to the longitudes and the latitudes in the latitude and longitude information carried in the broadcast message received. When the network element sends the broadcast message to the network element of which the latitude and longitude is contrary, the transmitting paths of the broadcast message will become longer, leading to a waste of network resources. Therefore, when the location indicated in the location information carried in the broadcast message is determined to be contrary to the location indicated in the location information of the network element, the broadcast message may be directly discarded by the network element receives the broadcast message.

Alternatively, when sending the broadcast message, network element A may carry its latitude and longitude information in the broadcast message. Upon receiving the broadcast message sent by network element A, network element B determines, according to the latitude and longitude information of network element A and the destination latitude and longitude information carried in the broadcast message as well as the latitude and longitude information of network element B, whether the broadcast message sent from network element A to the destination through network element B passes a contrary path. If the broadcast message passes the contrary path, network element B determines that the latitude and longitude information carried in the broadcast message received is contrary to its own latitude and longitude information and discards the broadcast message. For example, the latitude and longitude information of network element A is east longitude 116 degrees, 14 minutes and 20 seconds, north latitude 39 degrees, 13 minutes and 22 seconds; the latitude and longitude information of network element B is east longitude 116 degrees, 14 minutes and 40 seconds, north latitude 39 degrees, 13 minutes and 42 seconds; upon receiving the broadcast message sent by network element A in which the directional destination latitude and longitude information is east longitude 116 degrees, 14 minutes and 10 seconds, north latitude 39 degrees, 13 minutes and 12 seconds, network element B determines that the path from network element B to the directional destination is contrary to that from network element A to B, i.e. network element B determines that the latitude and longitude in the latitude and longitude information carried in the broadcast message received is contrary to that in its own latitude and longitude information, therefore, discards the broadcast message.

Taking the latitude and longitude information as an example, the description is hereinafter given for completely matching, partially matching and matching in the above embodiments, respectively.

The completely matching means that the location information of the network element is a subset of the location information carried in the broadcast message, which in fact includes two cases. One is that the location information carried in the broadcast message is completely the same as that of the network element, e.g. the location information carried in the broadcast message is east longitude 116 degrees, 4 minutes and 20 seconds, north latitude 39 degrees, 3 minutes and 32 seconds, and the location information of the network element is also east longitude 116 degrees, 4 minutes and 20 seconds, north latitude 39 degrees, 3 minutes and 32 seconds. The other is that the location information of the network element is part of the location information carried in the broadcast message, e.g. the location information carried in the broadcast message is east longitude 116 degrees and 4 minutes, north latitude 39 degrees and 3 minutes, and the location information of the network element is east longitude 116 degrees, 4 minutes and 20 seconds, north latitude 39 degrees, 3 minutes and 32 seconds.

The partially matching means that the location information of the network element intersects the location information carried in the broadcast message but does not completely match, which also includes two cases. One is that the location information carried in the broadcast message is part of the location information of the network element, e.g. the location information carried in the broadcast message is east longitude 116 degrees, 4 minutes and 25 seconds, north latitude 39 degrees, 3 minutes and 42 seconds, and the location information of the network element is east longitude 116 degrees, 4 minutes and 10 seconds to east longitude 116 degrees, 5 minutes and 30 seconds, north latitude 39 degrees, 3 minutes and 32 seconds to north latitude 39 degrees, 3 minutes and 52 seconds. The other is that there is the same part and different part between the location information of the network element and the location information carried in the broadcast message, e.g. the location information carried in the broadcast message is east longitude 116 degrees, 4 minutes and 20seconds to east longitude 116 degrees, 5 minutes and 50 seconds, north latitude 39 degrees, 3 minutes and 32 seconds to north latitude 39 degrees, 3 minutes and 52 seconds, and the location information of network element is east longitude 116 degrees, 4 minutes and 10 seconds to east longitude 116 degrees, 5 minutes and 30 seconds, north latitude 39 degrees, 3 minutes and 32 seconds to north latitude 39 degrees, 3 minutes and 52 seconds. The items of the location information have the same part: east longitude 116 degrees, 4 minutes and 20 seconds to east longitude 116 degrees, 5 minutes and 30 seconds, north latitude 39 degrees, 3 minutes and 32 seconds to north latitude 39 degrees, 3 minutes and 52 seconds, which is the matched part, and the rest is the unmatched part, this is partially matching.

The so-called "matching" includes all cases of the completely matching and the partially matching.

When the location information is latitude and longitude information and the ranges of the network in use are all in the northeast semi-sphere or southeast semi-sphere, the value of latitude and longitude may be set in the latitude and longitude information without such identifier as "east longitude" and "north latitude".

For specific geographical names or other location information, the implementing idea of this disclosure is basically the same as that of the six embodiments above except for replacing the latitude and longitude information by the specific geographical names or the other location information and determining the location information according to preset determination logic of the specific geographical names or the other location information. And such determining method may be flexibly implemented according to the determining method using the latitude and longitude as the location information, thus no further description will be given.

The foregoing is the description in accordance with specific embodiments of this disclosure. In specific implementation, the method of this disclosure may be appropriately modified to meet the demand of specific cases. It may be understood, thus, that the specific embodiments in accordance with the disclosure are just demonstrative, and are not for use in limiting the protection scope of this disclosure.

What is claimed is:

1. A method for implementing directional broadcast, comprising:
   receiving, by a network element, a broadcast message sent by a content server and carrying a first location information;
   determining, by the network element, whether the first location information matches a location information of the network element preset in the network element;
   sending, by the network element, the broadcast message if the first location information matches the location information of the network element; and
   if the first location information does not match the location information of the network element, finding one or more network elements whose location is proximal to the location indicated in the first location information according to the location information of other network elements related to the network element, and sending the broadcast message to the one or more network elements.

2. The method of claim 1, wherein the network element is a network element capable of directly transmitting; and the sending the broadcast message if the first location information matches the location information of the network element comprises: broadcasting the broadcast message to terminals if the first location information matches the location information of the network element.

3. The method of claim 1, wherein the network element is a network element having a control area or an intermediate transferring network element; and the network element sends the broadcast message to a subordinate network element or to a next network element if the first location information matches the location information of the network element.

4. The method of claim 1, further comprising:
   before determining whether the first location information matches the location information of the network element, determining, by the network element, whether the location indicated in the first location information is contrary to the location indicated in the location information of the network element;
   if the location indicated in the first location information is contrary to the location indicated in the location information of the network element, discarding the broadcast message.

5. The method of claim 1, further comprising:
   before finding the one or more network elements, determining, by the network element, whether the location indicated in the first location information is contrary to the location indicated in the location information of the network element;
   if the location indicated in the first location information is contrary to the location indicated in the location information of the network element, discarding the broadcast message.

6. The method of claim 1, wherein the process of sending the broadcast message if the first location information matches the location information of the network element comprises:
   if the first location information completely matches the location information of the network element, sending the broadcast message to all subordinate network elements or all next network elements among said other network elements related to the network element;
   if the first location information partially matches the location information of the network element, sending the broadcast message to a subordinate network element or a next network element among said other network elements related to the network element according to both a matched part and the location information of said other network elements related to the network element.

7. The method of claim 6, wherein the process of sending the broadcast message to the subordinate network element or the next network element according to both the matched part and the location information of said other network elements related to the network element comprises:
   searching the location information of said other network elements related to the network element to find the location information matching the matched part, and sending the broadcast message to the subordinate network element or the next network element corresponding to the location information matching the matched part.

8. The method of claim 6, further comprising:
   upon sending the broadcast message to the subordinate network element or the next network element according to both the matched part and the location information of said other network elements related to the network element,
   searching the location information of said other network elements related to the network element to find location information of one or more network elements; wherein the location indicated in the location information of one or more network elements is proximal to the location indicated in an unmatched part, and sending the broadcast message to the one or more network elements corresponding to the location information found.

9. The method of claim 1, wherein the location information comprises latitude and longitude information or geographical name information.

10. A network element, comprising:
    a first module, for receiving a broadcast message carrying a first location information;
    a second module, for determining whether the first location information matches a location information of the network element preset in the network element;
    a third module, for sending the broadcast message if the first location information matches the second location information; and
    a fourth module, for finding one or more network elements whose location is proximal to the location indicated in the first location information according to the location information of other network elements related to the network element if the first location information does not match the location information of the network element, and sending the broadcast message to the one or more network elements.

11. The network element of claim 10, wherein the network element has a control area or is an intermediate transferring network element; and the broadcast message is sent to a subordinate network element or a next network element by the third module.

12. A broadcast system, comprising:
    a content server, for sending a broadcast message carrying a first location information;
    a network element, for receiving the broadcast message, determining whether the first location information matches the location information of the network element preset in the network element, sending the broadcast message if the first location information matches the location information of the network element, finding one or more network elements whose location is proximal to the location indicated in the first location information according to the location information of other network elements related to the network element if the first location information does not match the location information of the network element, and sending the broadcast message to the one or more network elements.

13. The broadcast system of claim 12, wherein the network element has a control area or is an intermediate transferring network element; and the broadcast message is sent to a subordinate network element or a next network element by the network element if the first location information matches the location information of the network element.

* * * * *